３,223,687
Patented Dec. 14, 1965

3,223,687
PREPARATION OF TERPOLYMERS AND FILMS
Bernard F. Crowe, Maplewood, N.J., assignor, by mesne assignments, to Cumberland Chemical Corporation, New York, N.Y., a corporation of Delaware
No Drawing. Filed Mar. 21, 1962, Ser. No. 181,448
14 Claims. (Cl. 260—80.5)

This invention relates to new and useful polymeric materials and is more particularly concerned with vinyl acetate-vinyl pyrrolidone-lauryl methacrylate terpolymers, vinyl alcohol-vinyl pyrrolidone-lauryl methacrylate terpolymers, and water soluble materials prepared from vinyl alcohol-vinyl pyrrolidone-lauryl methacrylate terpolymers.

Films prepared from polyvinyl alcohol or vinyl alcohol copolymers or interpolymers are known in the art. Some of these films have been suggested for use as water soluble films. Water soluble films are useful in packaging and other applications. The water soluble films, based on vinyl alcohol, known in the art have not been entirely satisfactory. In many cases these prior art films do not have the desired solubility characteristics or the desired flexibility characteristics. For example, some of these films will not dissolve rapidly in cold water, or they may have poor flexibility, or they may have poor flexibility after being stored for some time. Also, these films may not be entirely satisfactory because the film materials may change in physical properties or characteristics with time, or may lose flexibility due to loss of modifiers or plasticizers. In general, the previously known water soluble films, prepared from vinyl alcohol polymers, do not possess all of the properties required for water soluble films.

It is an object of this invention to provide vinyl acetate-vinyl pyrrolidone-lauryl methacrylate terpolymers, and vinyl alcohol-vinyl pyrrolidone-lauryl methacrylate terpolymers.

A further object of this invention is to provide a method of preparing vinyl alcohol-vinyl pyrolidone-lauryl methacrylate terpolymers.

A still further object is to provide films which are water soluble, in the absence of agitation, over a wide temperature range.

A further object is to provide clear, colorless water soluble films with improved and controlled flexibility characteristics.

These and other objects, as well as other advantages of this invention will become apparent or will be clarified in or detailed specifically in the following description.

Water soluble vinyl alcohol-vinyl pyrrolidone-lauryl methacrylate terpolymers are novel compositions of this invention. These terpolymers are suitable for fabrication into films and other similar articles having the desired flexibility and water solubility chracteristics. The terpolymers are advantageously prepared by polymerizing a mixture of vinyl acetate, vinyl pyrrolidone, and lauryl methacrylate. The polymerization produces a vinyl acetate-vinyl pyrrolidone-lauryl methacrylate terpolymer. This terpolymer is then hydrolyzed to convert the acetyl groups to hydroxyl groups and yield the terpolymer of this invention, vinyl alcohol-vinyl pyrrolidone-lauryl methacrylate terpolymer.

In general, known polymerization techniques using a free radical catalyst or initiator are utilized to prepare the vinyl acetate-vinyl pyrrolidone-lauryl methacrylate terpolymer. This terpolymer is then subjected to hydrolysis in order that the vinyl acetate portions of the terpolymer be converted to vinyl alcohol portions. The hydrolysis is conducted so that the vinyl pyrrolidone and lauryl methacrylate portions of the terpolymer remain undisturbed and are not chemically changed. The terms "hydrolyzed" and "hydrolysis" are used in their generic art-recognized meaning to denote the conversion of the vinyl acetate portions of polymers to the corresponding vinyl alcohol portions of polymers, without regard to the procedure used, whether they be alcoholysis, saponification, or hydrolysis. The resulting vinyl alcohol terpolymer is referred to as the hydrolyzed terpolymer. It is important that the hydrolyzed terpolymer contain vinyl alcohol, vinyl pyrrolidone, and lauryl methacrylate, in order that one may obtain a terpolymer having the desired water solubility and flexibility properties when fabricated into films or other articles.

Throughout this specification, including the examples, the percentage values used to give the compositions of the terpolymers are expressed as percent by weight.

The terpolymers of this invention contain from about 60% to about 80% vinyl alcohol; from about 20% to about 30% vinyl pyrrolidone; and from about 1% to about 10% lauryl methacrylate. These percentage composition ranges of the vinyl alcohol-vinyl pyrrolidone-lauryl methacrylate terpolymer represent the preferred terpolymers and the most advantageous terpolymer compositions. While a variety of monomeric materials may be used in preparing these terpolymers, it has been found that it is simple and advantageous to utilize a vinyl acetate-vinyl pyrrolidone-lauryl methacrylate terpolymer as the starting material to prepare these terpolymers. Since the most advantageous procedure involves the conversion of the vinyl acetate portions of the vinyl acetate-vinyl pyrrolidone-lauryl methacrylate terpolymer to vinyl alcohol portions; the starting material terpolymer should have a composition of from about 76% to about 88% vinyl acetate; from about 11% to about 17% vinyl pyrrolidone; and from about 1% to about 7% lauryl methacrylate. These are the most advantageous and preferred compositions of the starting material terpolymer.

The starting material terpolymer may be prepared, as previously indicated, by any of the well-known polymerization techniques. For example, the starting material terpolymer may be prepared by bead or suspension polymerization techniques. These techniques involve introducing the desired quantities of monomers into a suitable reaction vessel containing a volume of water about equal to the volume of the monomers. The water contains a small amount of a suspending agent, as partially acetylated polyvinyl alcohol, gelatin, methyl cellulose, or hydroxyethyl cellulose. A suitable polymerization initiator or catalyst as, $\alpha,\alpha'$-azodiisobutyronitrile, benzoyl peroxide, capryloyl peroxide, lauroyl peroxide, or diisopropyl peroxydicarbonate, is added to the reaction mixture with the monomers or is added as part of the monomer mixture, or added with one of the monomers. An inert gas, as nitrogen, is usually used to flush the reaction mixture and maintain an inert gas atmosphere in the reaction vessel during the polymerization period. One or more of the monomers can be added in increments as polymerization proceeds if desired. This procedure generally yields terpolymers of uniform composition. No major advantage has been found by preparing the terpolymers of this invention by incremental addition, however, since terpolymers of substantially uniform composition are also obtained by adding all the monomers to the reaction vessel at the same time. The reaction mixture is stirred continuously during the polymerization period. The reaction mixture is heated to a moderate temperature and is maintained at this temperature for the polymerization period. Temperatures of about 50° C. to about 90° C. are satisfactory. A reflux condenser is provided on the reaction vessel to return any of the vaporized materials to the reaction mixture. The polymerization period can be varied, but periods of about 3 to 8 hours are usually satisfactory to complete the polymerization reaction. After polymerization is complete the stirring is discontinued and the reaction mixture is heated to remove the water and any unreacted monomers, mainly vinyl acetate. The vinyl acetate-vinyl pyrrolidone-lauryl methacrylate terpolymer beads or particles are obtained from the cooled reaction mixture by filtering. The terpolymer beads are then washed and dried. The beads may be readily dissolved in a solvent, as methanol, for preparation of the vinyl alcohol-vinyl pyrrolidone-lauryl methacrylate terpolymer.

Another polymerization technique useful for preparing the starting material terpolymer is solution polymerization. In this technique the desired amount of monomers, vinyl acetate, vinyl pyrrolidone, and lauryl methacrylate, are dissolved in a solvent, as methanol, contained in a suitable reaction vessel. The amount of solvent can be about equal to the volume of the monomers. Solvents as benzene, toluene, cyclohexane, and n-hexane can be used. The free radical initiator or catalyst can be added with the monomers. Initiators as $\alpha,\alpha'$-azodiisobutyronitrile, benzoyl peroxide, lauroyl peroxide, caprylyol peroxide, and diisopropyl peroxydicarbonate can be used. The reaction solution is flushed with an inert gas, as nitrogen, before any heating or stirring; and an inert gas atmosphere is maintained in the reaction vessel during polymerization. The reaction solution is heated to about 50° C. to about 90° C., and is maintained at this temperature until polymerization is complete. The solution is stirred continuously during polymerization. To complete the polymerization about 2 hours to about 6 hours are required. Refluxing of volatile materials is used. After polymerization is complete the reaction solution is heated to remove the methanol and any unreacted monomers. The material remaining in the reaction vessel is collected, filtered, washed, and dried. The terpolymer obtained may be dissolved readily in methanol.

The usual, well-known emulsion polymerization techniques may also be used to prepare the starting material terpolymer. Bulk polymerization techniques may also be used. It is preferred to prepare the starting material terpolymer by suspension or solution polymerization techniques.

The hydrolyzed terpolymer of this invention, vinyl alcohol-vinyl pyrrolidone-lauryl methacrylate terpolymer, is prepared from the corresponding starting material terpolymer, vinyl acetate-vinyl pyrrolidone-lauryl methacrylate terpolymer by hydrolysis. This procedure results in the conversion of the vinyl acetate portions of the starting material terpolymer to vinyl alcohol portions. In using any hydrolysis procedure, it is important that none of the vinyl pyrrolidone, or lauryl methacrylate portions of the starting material terpolymer be affected.

The hydrolyzed terpolymer may be prepared by the base catalyzed hydrolysis of the starting material terpolymer, while dissolved in a suitable amount of a lower alkanol, as methanol. Various base materials may be used, as sodium hydroxide, potassium hydroxide, sodium methylate, potassium methylate, as well as other basic materials useful for catalyzing hydrolysis reactions. Suitably the starting material terpolymer is dissolved in the lower alkanol; the resulting solution is then added slowly to a solution of methanol. The methanol solution contains about 2 parts of basic catalyst per 100 parts of methanol. The terpolymer is added over a period of about 1 to 4 hours. The reaction proceeds readily at ambient temperature and is complete in about 6 hours. The reaction results in the complete conversion of the vinyl acetate portions to vinyl alcohol portions. The hydrolyzed terpolymer is normally soluble in the hydrolysis solution and is obtained readily as a precipitate by adding a solvent, as acetone, to the hydrolysis solution. The precipitate is recovered by filtering.

Acid catalyzed hydrolysis may be used to prepare the hydrolyzed terpolymer. For example, a 1% solution of sulfuric acid in ethanol may be used to effect hydrolysis.

The following examples are illustrative of the novel materials, procedures, and techniques of this invention.

*Example 1*

A monomer solution was prepared containing 105.6 grams of vinyl acetate, 12.0 grams of vinyl pyrrolidone, 2.4 grams of lauryl methacrylate, and 0.6 gram of $\alpha,\alpha'$-azodiisobutyronitrile. The monomer-initiator mixture was introduced into a reaction vessel-polymerization kettle, which contained 180 grams of methanol. The vessel was equipped with a stirrer, thermometer, reflux condenser, heating mantle, and nitrogen flushing means. The monomer-initiator-methanol mixture in the vessel was flushed with nitrogen prior to any heating or stirring. The reaction mixture was then heated to and maintained at a temperature of 62° C., with continuous stirring, for a polymerization period of 3 hours. During the polymerization period the reflux condenser was operated to return volatile materials to the reaction mixture. At the end of the 3 hour polymerization period the temperature was increased and the methanol, and unreacted monomer, mainly vinyl acetate, was removed from the vessel. The residual terpolymer remaining in the vessel was collected, then washed and filtered. The terpolymer obtained contained 84% vinyl acetate, 13.1% vinyl pyrrolidone, and 2.8% lauryl methacrylate.

The terpolymer was then dissolved in methanol. The terpolymer-methanol solution was then added slowly to a stirred solution of 18 grams of sodium hydroxide in 500 grams of methanol. Four hours were required to complete the addition of the terpolymer-methanol solution to the sodium hydroxide solution. This addition results in the hydrolysis of the vinyl acetate portion of the terpolymer. The hydrolyzed terpolymer in the methanol solution was recovered by adding acetone to the methanol solution. Enough acetone was added to precipitate all of the hydrolyzed terpolymer. The hydrolyzed terpolymer was collected by filtering the precipitated mixture and solution. The hydrolyzed terpolymer was analyzed for hydroxyl content, nitrogen content, and saponification number. Analysis indicated the hydrolyzed terpolymer contained 73.0% vinyl alcohol, 22.2% vinyl pyrrolidone, and 4.8% lauryl methacrylate.

Films were prepared from the hydrolyzed terpolymer by dissolving the terpolymer in water and casting a film from this solution. One film sample was cast from this solution, allowed to stand for 30 minutes, and dried in a forced draft oven, at 60° C. for 3 hours. The film sample after drying had good flexibility and water solubility characteristics. After one week of exposure to the open air, the film sample was again heated for 4 hours at 60° C. The film was 1.6 mils (0.0016 inch) thick. The film when tested for water solubility, completely disintegrated in water after 7 seconds, and was completely dissolved in 20 seconds. This film sample was dried again for 48 hours, and when tested in water, disintegrated in 6 seconds and was completely dissolved in 17 seconds.

Example 2

An aqueous solution was prepared by introducing into a reaction vessel 300 grams of distilled deionized water and 5 grams of a 1% water solution of polyvinyl alcohol. The water-polyvinyl alcohol solution was heated to 70° C. and then cooled to 50° C. A monomer mixture containing 267 grams of vinyl acetate, 9 grams of vinyl pyrrolidone, and 0.9 gram of lauryl methacrylate was then added to the cooled water-polyvinyl alcohol solution. Also added at this time was 0.9 gram of $\alpha,\alpha'$-azodiisobutyronitrile. The reaction mixture was then flushed with nitrogen and a nitrogen atmosphere was maintained in the reaction vessel. The reaction vessel was heated and the reaction mixture was stirred continuously. Vinyl acetate was continuously removed from the reaction vessel and recovered by distillation. At the end of a three-hour period of heating the temperature of the reaction mixture was 92° C., and 202 grams of unreacted vinyl acetate had been recovered by distillation. At the end of the heating period the temperature was increased and the water was removed from the reaction vessel. The terpolymer remaining in the vessel consisted mainly of discrete, sandy particles. The terpolymer particles were filtered, washed, and dried. The terpolymer contained 87.4% vinyl acetate, 11.5% vinyl pyrrolidone, and 1.1% methyl methacrylate.

The terpolymer was hydrolyzed by the following procedure. The recovered terpolymer particles were dissolved in methanol, giving a cloudy, colloidal type solution. This solution was added slowly to a solution containing 10 grams of sodium hydroxide and 300 grams of methanol. The hydrolyzed terpolymer was recovered by adding acetone to the methanol solution. The hydrolyzed terpolymer was recovered by filtering the precipitated mixture. Analytical results indicated the hydrolyzed terpolymer contained, 78% vinyl alcohol, 20% vinyl pyrrolidone, and 2% lauryl methacrylate.

Portions of the hydrolyzed terpolymer were dissolved in water and films were cast by solution casting. A representative film sample was solution cast and dried in a forced draft oven at 60° C. for 4 hours. The film had good flexibility characteristics, and maintained these characteristics, after long periods of standing, when tested. The film was 1.9 mils thick and disintegrated in water in 20 seconds and was completely dissolved in water by 45 seconds.

Example 3

A monomer-initiator mixture was prepared and contained 206.2 grams of vinyl acetate, 24.0 grams of vinyl pyrrolidone, 9.6 grams of lauryl methacrylate, and 1.2 grams of $\alpha,\alpha'$-azodiisobutyronitrile. The monomer-initiator mixture was introduced into a reaction vessel containing 240 grams of methanol. The procedures and apparatus used were essentially the same as in Example 1. The polymerization period was 3 hours. The methanol and unreacted vinyl acetate recovered at the end of this period amounted to 330 grams. Of this recovered mixture approximately 29% was vinyl acetate. The recovered terpolymer contained 76.3% vinyl acetate, 16.9% vinyl pyrrolidone, and 6.5% lauryl methacrylate. To obtain the hydrolyzed terpolymer, the recovered terpolymer was dissolved in methanol and added slowly to a solution of 9 grams of sodium hydroxide in 500 grams of methanol. The hydrolyzed terpolymer contained 62.5% vinyl alcohol, 27.0% vinyl pyrrolidone, and 10.5% lauryl methacrylate. Films were prepared from the hydrolyzed terpolymer by casting from a water solution. A representative film was 1.7 mils thick and disintegrated in water in 4 seconds and was completely dissolved in water before 12 seconds.

The hydrolyzed terpolymers of this invention are useful in preparing water soluble articles as films. Conventional and well-known techniques, as solution casting, may be used to prepare water soluble films of this invention. Extrusion techniques may also be used. The films prepared from the vinyl alcohol-vinyl pyrrolidone-lauryl methacrylate terpolymers are advantageous and desirable in that they maintained their water solubility and flexibility characteristics after long storage periods after fabrication. The films of this invention are useful for wrapping or enclosing substances as soaps, detergents, oils, bleaches, economic poisons, and other materials. The substances designed to be used in water can be water soluble or water insoluble.

While preferred embodiments of this invention have been described and illustrated, it is to be understood that widely different modifications of the invention may be made without departing from the scope and spirit of the invention. The invention is not to be limited by the foregoing examples and details of description except as defined by the following claims.

I claim:

1. A water-soluble film-forming terpolymer comprising vinyl alcohol, vinyl pyrrolidone, and lauryl methacrylate, said vinyl alcohol being the major constituent of said terpolymer and said lauryl methacrylate being present in the least amount in said terpolymer.

2. A water-soluble film-forming terpolymer containing from about 60% to about 80% vinyl alcohol, from about 20% to about 30% vinyl pyrrolidone, and from about 1% to about 10% lauryl methacrylate.

3. A water-soluble film-forming terpolymer comprising vinyl acetate, vinyl pyrrolidone, and lauryl methacrylate, said vinyl acetate being the major constituent of said terpolymer and said lauryl methacrylate being present in the least amount in said terpolymer.

4. A water-soluble film-forming terpolymer containing from about 76% to about 88% vinyl acetate, from about 11% to about 17% vinyl pyrrolidone, and from about 1% to about 7% lauryl methacrylate.

5. A water soluble, flexible film prepared from a water-soluble film-forming terpolymer comprising vinyl alcohol, vinyl pyrrolidone, and lauryl methacrylate, said vinyl alcohol being the major constituent of said terpolymer and said lauryl methacrylate being present in the least amount in said terpolymer.

6. A water soluble, flexible film prepared from a water-soluble film-forming terpolymer comprising from about 60% to about 80% vinyl alcohol, from about 20% to about 30% vinyl pyrrolidone, and from about 1% to about 10% lauryl methacrylate.

7. The method for preparing a vinyl alcohol-vinyl pyrroildone-lauryl methacrylate terpolymer which comprises copolymerizing vinyl acetate, vinyl pyrrolidone, and lauryl methacrylate, and converting the resulting vinyl acetate-vinyl pyrrolidone-lauryl methacrylate terpolymer to a vinyl alcohol-vinyl pyrrolidone-lauryl methacrylate terpolymer by hydrolysis of said vinyl acetate.

8. The method according to claim 7 wherein the vinyl acetate-vinyl pyrrolidone-lauryl methacrylate terpolymer contains from about 76% to about 88% vinyl acetate, about 11% to about 17% vinyl pyrrolidone, and about 1% to about 7% lauryl methacrylate.

9. The method according to claim 7 wherein the vinyl alcohol-vinyl pyrrolidone-lauryl methacrylate terpolymer prepared contains from about 60% to about 80% vinyl alcohol, about 20% to about 30% vinyl pyrrolidone, and about 1% to about 10% lauryl methacrylate.

10. The method according to claim 9 wherein the vinyl acetate portions are converted by a base catalyzed reaction.

11. The method according to claim 10 wherein the base catalyzed reaction is conducted in the presence of a lower alkanol.

12. The method according to claim 11 wherein the lower alkanol is methanol.

13. A method for preparing a terpolymer containing from about 60% to about 80% vinyl alcohol, about 20% to about 30% vinyl pyrrolidone, and about 1% to about 10% lauryl methacrylate, which comprises copolymerizing vinyl acetate, vinyl pyrrolidone, and lauryl methacrylate in proportions yielding a terpolymer containing from about 76% to about 88% vinyl acetate, about 11% to about 17% vinyl pyrrolidone, and about 1% to about 7% lauryl methacrylate, dissolving said vinyl acetate-vinyl pyrrolidone-lauryl methacrylate terpolymer in methanol, adding a catalytic amount of a compound selected from the group consisting of sodium hydroxide, potassium hydroxide, sodium methylate, and potassium methylate, and converting said terpolymer in said solution to a terpolymer containing vinyl alcohol, vinyl pyrrolidone, and lauryl methacrylate.

14. The method according to claim 13 wherein the catalyst is sodium hydroxide.

References Cited by the Examiner

UNITED STATES PATENTS

| | | | |
|---|---|---|---|
| 2,129,662 | 9/1938 | Barrett et al. | 260—86.1 |
| 2,667,473 | 1/1954 | Morner et al. | 260—88.3 |
| 3,025,253 | 3/1962 | Mayne et al. | 260—86.1 |

OTHER REFERENCES

Smith: "Vinyl Resins," Reinhold Publishing Corp.; New York, N.Y., 1958.

Kahn et al.: J. Pol. Sci. 54, 363–74 (1961).

JOSEPH L. SCHOFER, *Primary Examiner.*

J. R. LIBERMAN, *Examiner.*